W. A. KENDRICK.
DEPOSIT AND COLLECTION RECEPTACLE.
APPLICATION FILED MAR. 2, 1915.
1,174,423.
Patented Mar. 7, 1916.
2 SHEETS—SHEET 2.
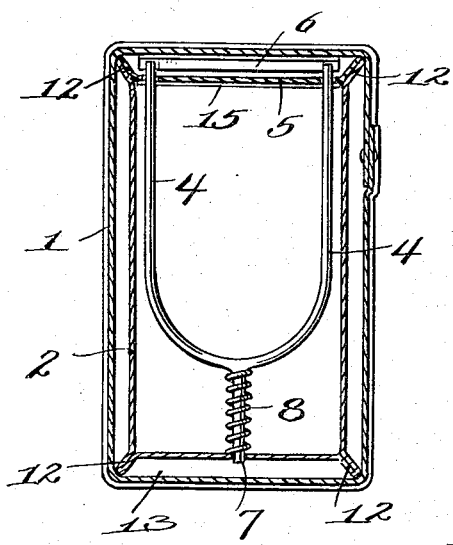
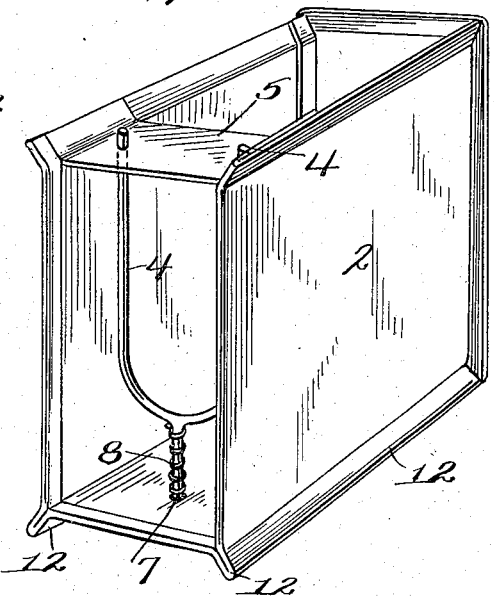
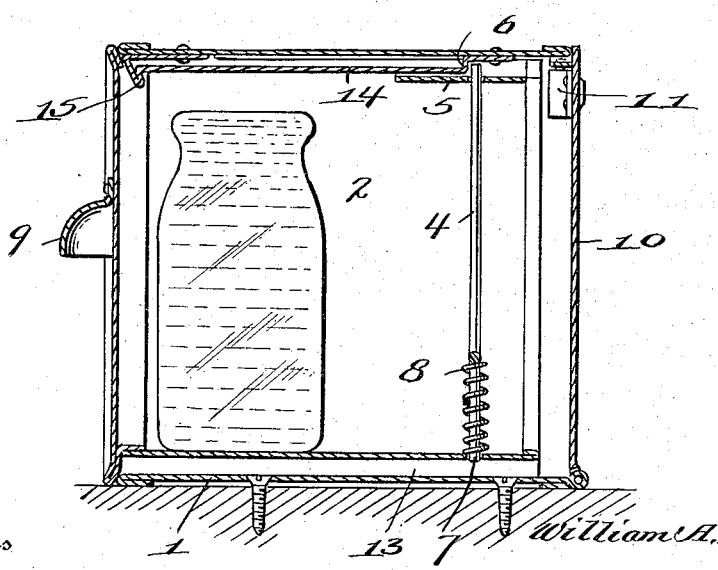

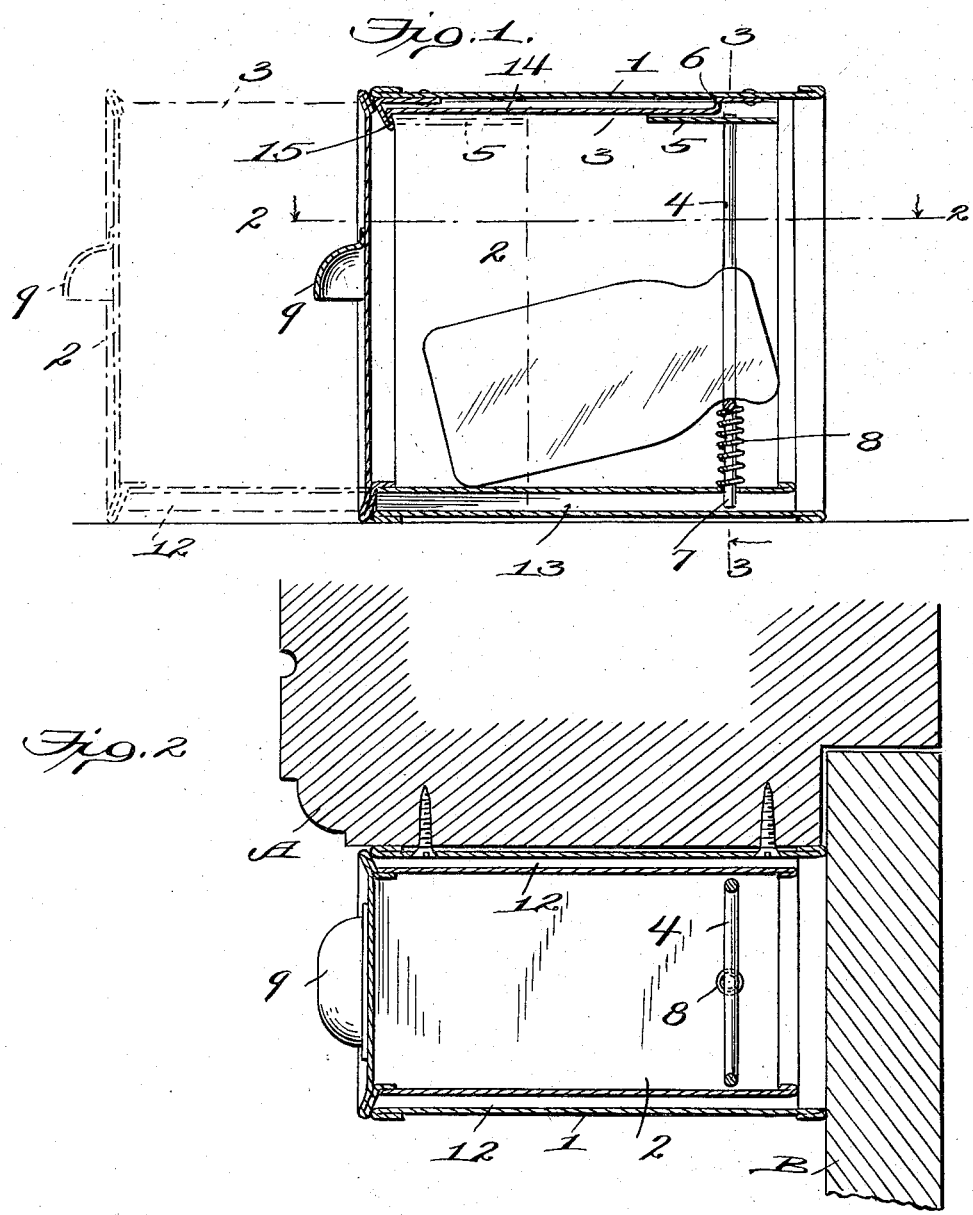

UNITED STATES PATENT OFFICE.

WILLIAM A. KENDRICK, OF WASHINGTON, DISTRICT OF COLUMBIA, ASSIGNOR OF ONE-THIRD TO CLARENCE F. SOWERS, OF WASHINGTON, DISTRICT OF COLUMBIA.

DEPOSIT AND COLLECTION RECEPTACLE.

1,174,423.  Specification of Letters Patent.  Patented Mar. 7, 1916.

Application filed March 2, 1915. Serial No. 11,509.

*To all whom it may concern:*

Be it known that I, WILLIAM A. KENDRICK, a citizen of the United States, residing at Washington, in the District of Columbia, have invented new and useful Improvements in Deposit and Collection Receptacles, of which the following is a specification.

This invention relates to improvements in deposit and collection receptacles, and more particularly to a receptacle designed to promote the safe delivery of full milk bottles and the return of empty milk bottles.

The objects of the invention, briefly stated, are to provide a receptacle which, when it contains a full milk bottle, is locked against unauthorized access; which, when it contains an empty milk bottle, may be opened by the milkman for the purpose of removing the said empty bottle and of inserting a full bottle, but can be opened by the milkman only in the event that it contains an empty bottle; which requires for its practical use only the operations of opening and closing the closure element; which, when exposed to weather conditions is in no way detrimentally affected by such conditions; which is in no way liable to derangement or to a failure to operate in the manner prescribed; and which is exceedingly simple in construction and may be inexpensively manufactured.

With the above objects in view, the invention consists, generally, in a receptacle made in interfitting parts, one of which is fixed to a suitable support, and the other of which, constituting or including the closure element of the receptacle, carries the milk bottles, full or empty, as the case may be, and when in position to close the receptacle, is automatically locked to the stationary part, the locking means being, however, operated to release the movable part from the stationary part when an element of said means is engaged by an empty milk bottle inserted in the movable part.

An embodiment of the invention is illustrated in the accompanying drawings, wherein:—

Figure 1 is a vertical longitudinal sectional view showing the receptacle closed and containing an empty milk bottle; Fig. 2 is a horizontal sectional view on the line 2—2 of Fig. 1; Fig. 3 is a vertical cross-sectional view on the line 3—3 of Fig. 1; Fig. 4 is a detail perspective view of a drawer or milk container forming an element of the receptacle; Fig. 5 is a vertical longitudinal sectional view showing a slightly modified construction especially adapted for use in apartment houses and showing the receptacle as containing a full milk bottle.

Similar characters of reference designate corresponding parts throughout the several views.

The improved receptacle consists of interfitting bodies 1 and 2. In the embodiment disclosed the body 1 is stationary and is of rectangular cross section and the body 2 is in the form of a drawer and fits telescopically within the body 1. The drawer 2 has an opening 3 in its upper side through which the empty milk bottles are withdrawn and the full milk bottles are deposited; and when pushed as far as possible into the body 1 constitutes a complete closure for the receptacle, preventing access thereto except from the rear thereof.

When the drawer 2 is closed, it is automatically locked against outward movement relatively to the body 1, preferably by the means shown which comprises a U-shaped bolt 4, the legs of which project loosely through openings in a horizontal web 5 extending across the upper side of the drawer 2 in the rear of the opening 3 and engage in the rear of and against a shoulder 6 associated with the top wall of the body 1. The bolt 4 has at its lower end a depending central shank or guide pin 7 which works loosely through an opening in the bottom of the drawer 2 and upon which is mounted an expansive coil spring 8 bearing at its lower end against the bottom of the drawer 2 and at its upper end against the bolt 4 and urging said bolt upwardly.

The bolt 4, by virtue of its U-shaped form, provides a cradle for an empty milk bottle, the neck portion of which will rest in said cradle, when the milk bottle is inserted horizontally into the drawer 2 from the rear thereof, and will depress the bolt 4 against the tension of its spring 8 whereby the upper ends of said bolt will be below the shoulder 6. When the bolt 4 is thus depressed, the drawer 2 may be opened in the usual manner, its front wall preferably having a suitable handle 9.

The bolt 4 is so arranged that while it may be utilized, as above described, to serve as a cradle for an empty milk bottle inserted in a horizontal position in the drawer 2, it will be in the rear of a full milk bottle inserted in an upright position in said drawer through the opening 3 thereof. Consequently, when a full milk bottle is placed in the drawer by the milkman and the drawer is closed, the bolt 4 is operated by its spring 8 to engage the shoulder 6 and prevent outward movement of the drawer.

When the drawer 2 is closed and is locked in closed position by the means described, access may be had to the receptacle only from the rear thereof. Where the receptacle is secured at one side of a door frame A, as shown in Fig. 2, its rear side will be closed by the door B when the latter is closed; and access may be had to the receptacle from the rear side thereof only when the door B is open. In this way unauthorized access to the receptacle from the rear thereof is prevented. When the receptacles are used in apartment houses whose rules forbid the mounting of the receptacle outside of the door of the apartment, the receptacles may be arranged in the basement of the building and their rear sides may be closed, (see Fig. 5) for example, by hinged doors 10 secured to a wall of the body 1 and provided with a suitable key-operated lock 11 which can be opened only by the holder of the apartment to which the receptacle may be assigned.

The side walls of the drawer 2 are suitably spaced from the side walls of the receptacle 1 to reduce frictional resistance to the sliding movements of the drawer 2; but are provided at their upper and lower edges with flared portions 12 which engage the corners of the body 1 and serve as guides for the drawer 2. The flared portions 12 at the lower side edges of the drawer 2 likewise and for a similar purpose, space the bottom of the drawer 2 from the bottom of the body 1. The space 13 between the bottom of the drawer 2 and the bottom of the body 1 and into which the pin or shank 7 of the bolt 4 projects has its depth selected to insure of the requisite downward movement of the bolt whereby its upper ends will be below the shoulder 6. The said shoulder is preferably formed as a part of a panel or false top 14 which is secured to the upper side of the body 1 and which has at its front end an in-turned hook-like flange 15 against which the web 5 engages to limit the outward movement of the drawer 2.

By virtue of the spaced relation which obtains between the side walls and bottoms of the drawer 2 and the body 1 no appreciable frictional resistance is interposed to the sliding movement of the drawer 2 and the operation of said drawer in the manner prescribed will not be defeated by the freezing of any moisture which may happen to collect between the walls thereof and the adjacent walls of the body 1, as might be the case if the walls of the drawer 2 fitted snugly within and against the walls of the body 1.

The operation will be readily apparent from the foregoing description. Assuming that the drawer 2 is closed, and is locked in closed position by the bolt 4, the owner of the receptacle inserts an empty milk bottle into the drawer 2 through the open rear end thereof, the neck of the milk bottle resting within the cradle provided by the bolt 4 and moving said bolt downwardly, as described, whereby the drawer 2 may be opened. The milkman opens the drawer 2 and withdraws the empty milk bottle through the opening 3, thereafter inserting a full milk bottle in upright relation into said drawer through said opening and closing the drawer. When the drawer containing the full milk bottle is closed, it is automatically locked in closed position by the bolt 4. Thus, the only mechanical operations involved for the practical use of the device are the opening and closing of the drawer 2. However, as the opening of the drawer 2 is permitted only when said drawer contains an empty milk bottle, the householder in order to secure the certain and safe delivery of milk is under necessity of returning the empty bottles to the dealer. The receptacle thus works to the mutual advantage of both parties to the transaction, safeguarding the householder against the loss or theft of the daily supply of milk and insuring to the dealer the return of the empty bottles.

Having fully described my invention, I claim:—

1. A deposit and collection receptacle comprising a stationary body and a movable body, said bodies having a telescoping relation and the movable body serving as a closure for the receptacle and as a container for a milk bottle and having an opening through which a milk bottle may be inserted or withdrawn when the movable body is withdrawn from the stationary body, and automatically acting means for holding the movable body against withdrawal from the stationary body, the said means being held in position to permit withdrawal of the movable body when an element of said means is engaged by a milk bottle and being arranged to be at one side of a milk bottle deposited in upright relation into said movable body through said opening thereof.

2. A deposit and collection receptacle comprising a stationary body and a movable body, said bodies having a telescoping relation and the movable body serving as a closure for the receptacle and as a container for a milk bottle and having an opening through which a milk bottle may be inserted or withdrawn when the movable body is withdrawn from the stationary body, the movable body also having an opening at the rear thereof through which a milk bottle may be inserted or withdrawn when the movable body is in its closed position, and automatically acting means for holding the movable body against withdrawal from the stationary body, the said means being held in position to permit withdrawal of the movable body when an element of said means is engaged by a milk bottle occupying a horizontal position in the movable body and being arranged to be at one side of a milk bottle deposited in upright relation into said movable body through said first named opening thereof.

3. A deposit and collection receptacle comprising a stationary body and a drawer slidable therein and forming a closure therefor, the drawer serving as a container for a milk bottle and having an opening in its upper side through which a milk bottle may be inserted or withdrawn when the drawer is withdrawn, the drawer also having an opening at the rear thereof through which a milk bottle may be inserted or withdrawn when the drawer is closed, and automatically acting means located near the rear end of the drawer for preventing its withdrawal, the said means being operated to permit the withdrawal of the drawer when an element of said means is engaged by a milk bottle occupying a horizontal position in the drawer and being arranged to be in the rear of a milk bottle deposited in upright relation in said drawer through said opening in the upper side thereof.

4. A deposit and collection receptacle having a drawer provided with two openings, through one of which a milk bottle may be deposited in a horizontal position in the drawer when the drawer is closed and through the other of which a milk bottle may be deposited in an upright position when the drawer is open and automatically acting means for holding the drawer in closed position, the said means being held in position to release the drawer by a milk bottle disposed horizontally in the drawer.

5. A deposit and collection receptacle comprising a stationary body and a drawer slidable therein and forming a closure therefor, the drawer serving as a container for a milk bottle and having an opening in its upper side through which a milk bottle may be inserted or withdrawn when the drawer is withdrawn, the drawer also having an opening at the rear thereof through which a milk bottle may be inserted or withdrawn when the drawer is closed, and a spring held bolt carried by the drawer and operative to hold the drawer against outward movement from the stationary body, the bolt being formed as a cradle whereby it may be engaged by a milk bottle occupying a horizontal position in the drawer and operated by said bottle to release the drawer and permit of the outward movement thereof.

6. A deposit and collection receptacle comprising a stationary body and a drawer slidable therein and forming a closure therefor, the drawer serving as a container for a milk bottle and having an opening in its upper side through which a milk bottle may be inserted or withdrawn when the drawer is withdrawn, the drawer also having an opening at the rear thereof through which a milk bottle may be inserted or withdrawn when the drawer is closed, and a spring held bolt carried by the drawer and operative to hold the drawer against outward movement from the stationary body, the bolt being formed as a cradle whereby it may be engaged by a milk bottle occupying a horizontal position in the drawer and operated by said bottle to release the drawer and permit of the outward movement thereof, the drawer having a horizontal web at its upper side and near its rear end through which the bolt works and the stationary body having its top wall provided near its rear end with a shoulder for engagement by the bolt and near its front end with a stop flange for engagement by the web.

7. A deposit and collection receptacle comprising a stationary body and a drawer slidable therein and forming a closure therefor, the drawer serving as a container for a milk bottle and having an opening in its upper side through which a milk bottle may be inserted or withdrawn when the drawer is withdrawn, the drawer also having an opening at the rear thereof through which a milk bottle may be inserted or withdrawn when the drawer is closed, and automatically acting means located near the rear end of the drawer for preventing its withdrawal, the said means being operated to permit the withdrawal of the drawer when an element of said means is engaged by a milk bottle occupying a horizontal position in the drawer and being arranged to be in the rear of a milk bottle deposited in upright relation in said drawer through said opening in the upper side thereof, the drawer having its side walls provided with flaring upper and lower marginal flanges which engage in the corners of said stationary body and by which the side walls and bottom of the drawer are spaced from the side walls and bottom of the stationary body.

8. A deposit and collection receptacle comprising a stationary body and a movable body telescopically related thereto and forming a closure therefor, flanges provided on one of said bodies to engage the other body and to guide the movable body in its opening and closing movement, the flanges serving to maintain the adjacent walls of said bodies in spaced relation, the movable body serving as a container for a milk bottle and means for locking the movable body in closed position, the means being operated to release the movable body when an element of said means is engaged by a milk bottle.

In testimony whereof I have hereunto set my hand in presence of two subscribing witnesses.

WILLIAM A. KENDRICK.

Witnesses:
  CHAS. S. HYER,
  JOHN S. POWERS.

Copies of this patent may be obtained for five cents each, by addressing the "Commissioner of Patents, Washington, D. C."